W. C. SQUIRE.
Dirt Scraper.
No. 233,122.  Patented Oct. 12, 1880.
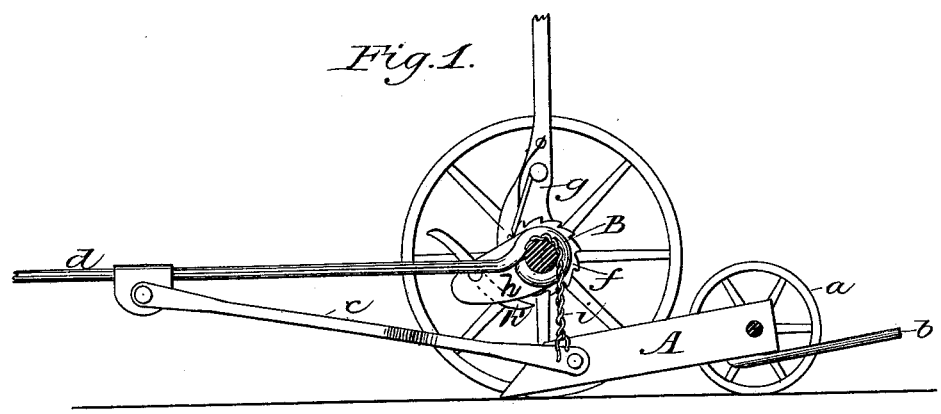
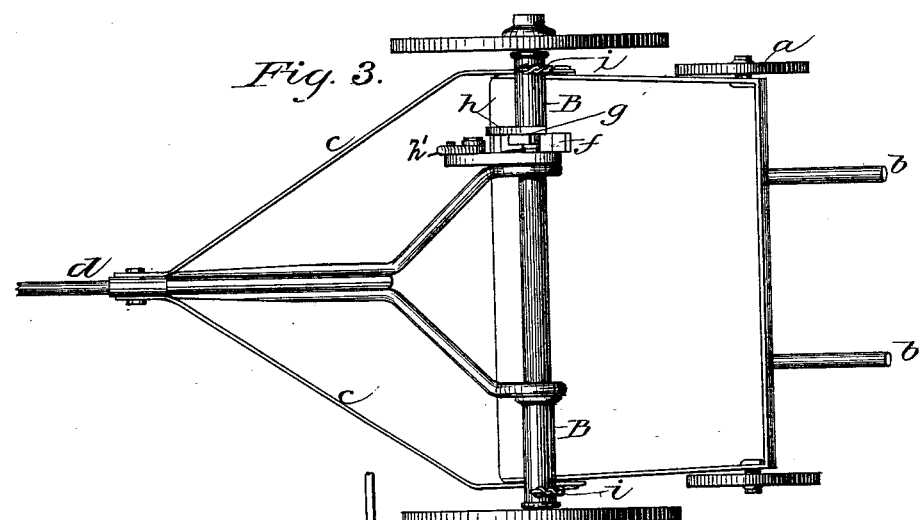
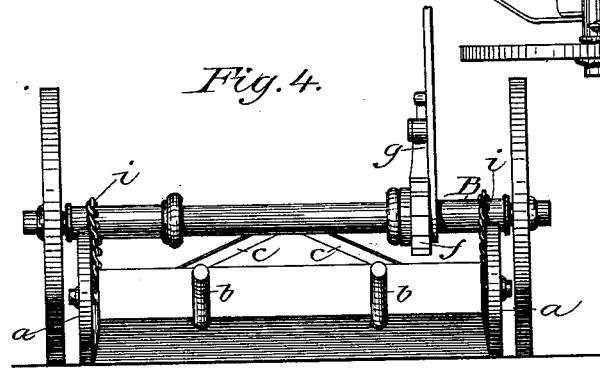
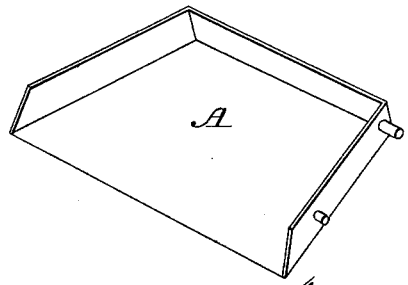
Witnesses:
Wm H. Tucker
E. C. Manter
Inventor:
Wesley C. Squire
by W L Fay his atty

UNITED STATES PATENT OFFICE.

WESLEY C. SQUIRE, OF FLORENCE, ASSIGNOR OF ONE-HALF OF HIS RIGHT TO WINSLOW LAMARTINE FAY, OF ELYRIA, OHIO.

DIRT-SCRAPER.

SPECIFICATION forming part of Letters Patent No. 233,122, dated October 12, 1880.

Application filed January 28, 1880.

*To all whom it may concern:*

Be it known that I, WESLEY C. SQUIRE, of Florence, in the county of Erie and State of Ohio, have invented a new and useful Improvement in Dirt-Scrapers, of which the following is a specification.

The invention relates to dirt-scrapers for excavating, grading, or moving dirt in making cellars, railroads, highways, ditches, or any place where it is desirable to remove dirt, earth, sand, and the like a short distance.

Heretofore such scrapers have been so constructed as to slide on the ground, or so mounted on wheels as to be objectionable.

The object of my invention is to provide a dirt-scraper so arranged that it will be simple and practical, be of light draft, and capable of removing large quantities of earth in a short space of time.

In the accompanying drawings, in which similar letters of reference indicate like parts, Figure 1 is a side elevation, with one pair of wheels removed. Fig. 2 is a detached view of scraper. Fig. 3 is a plan view, and Fig. 4 is an end elevation.

In the drawings, A represents the body of the scraper, which is substantially in form as seen in Fig. 2, of any suitable length on the front or cutting edge, and extends to the rear a suitable distance, having on its sides and across the rear end a suitable flange, as seen in the drawings. Said scraper is made about six inches narrower at the rear end than at the front. Near the rear end, on the sides of the scraper, are secured wheels $a\ a$ on suitable axles. Said wheels are of any suitable size, and subserve the double purpose of sustaining a portion of the weight of the load while in transit and forming a fulcrum, over which the operator is enabled to regulate the depth of cut while loading by means of the handles $b\ b$. Near the front edge of the scraper, and to the sides thereof, are pivoted two draw-bars, $c\ c$, which extend forward to and are pivoted to the pole $d$.

B represents a revolving axle, which has mounted on it wheels. Said wheels are of any suitable size. Said axle is cylindrical in form and of any suitable diameter, and is provided with a ratchet-wheel, $f$, a lever, and a dog, $g$, or other suitable device for the purpose of revolving said axle, when desired. To said axle, by any suitable means, the pole $d$ is attached. To the rear end of the pole, at the point where it is secured to the axle, a projection, $h$, is formed, on which a dog, $h'$, is secured, said dog being for the purpose of engaging the ratchet-teeth and securing the axle in any desired position.

$i\ i$ represent chains, which are secured to the axle and extend downward to the draw-bars, where the lower ends are secured.

The operation of my invention is as follows: The scraper is lowered down so that its front edge rests on the ground. The scraper is drawn forward, the rear end elevated so that the scraper fills. When this is done the handles are depressed, thus elevating the forward end so that it comes out of the ground, or the forward axle is revolved by the lever, dog, and ratchet, and thus, by means of the chains acting on the draw-bars, the front end of the scraper may be elevated to any desired height to clear all ordinary obstructions. The load, being thus on and supported by the four wheels, may be transported any desired distance. When the front edge is lowered to the ground the scraper is dumped by elevating the handles in the ordinary way. When the scraper is dumped, and while it lies against the forward axle, it may be elevated clear of the ground by turning the axle by means of the lever, the whole load being thus borne by the forward axle. When the surface is smooth over which the load is being conveyed the front end need not be elevated, as it swings itself clear of the ground when loaded.

What I claim is—

1. The scraper A, provided with wheels $a\ a$, in combination with draw-bars $c\ c$, chains $i\ i$, and axle B, each being constructed in the manner and for the purpose substantially as described.

2. The axle B, in combination with scraper A, mounted on wheels $a\ a$, the whole being constructed and operated in the manner and for the purpose substantially as described.

3. Revolving axle B and chains $i\ i$, in combination with draw-bars $c\ c$, for the purpose of elevating and depressing the cutting-edge of the scraper, the whole being constructed and operated in the manner and for the purpose substantially as described.

WESLEY C. SQUIRE.

Witnesses:
SILAS C. FRENCH,
GEORGE B. VANFLEET.